United States Patent [19]

Takahashi

[11] 4,253,753

[45] Mar. 3, 1981

[54] DATA ENTERING CAMERA

[75] Inventor: Akira Takahashi, Kawasaki, Japan

[73] Assignee: Ricoh Company, Ltd., Tokyo, Japan

[21] Appl. No.: 95,649

[22] Filed: Nov. 19, 1979

[30] Foreign Application Priority Data

Nov. 22, 1978 [JP] Japan .............................. 53-144735

[51] Int. Cl.³ .............................................. G03B 17/24
[52] U.S. Cl. ................................. 354/106; 346/107 B
[58] Field of Search ................ 354/76, 105, 106, 109; 346/107 A, 107 B; 368/1, 2, 10, 107, 113, 120

[56] References Cited

U.S. PATENT DOCUMENTS

| | | | |
|---|---|---|---|
| 3,502,009 | 3/1970 | Connors | 346/107 B X |
| 3,827,070 | 7/1974 | Hoerenz et al. | 354/105 |
| 3,953,868 | 4/1976 | Kawamura et al. | 354/109 |
| 4,143,956 | 3/1979 | Miyagawa | 354/106 |
| 4,167,315 | 9/1979 | Nanba et al. | 354/106 |

Primary Examiner—John Gonzales
Attorney, Agent, or Firm—Wyatt, Gerber, Shoup, Scobey & Badie

[57] ABSTRACT

A camera capable of entering data indicated by a stop watch in a photographing film, together with the image of an object comprises a time counter which starts its operation by operating a shutter of the camera, and a display section for displaying the value counted by the time counter and also for entering the value in the photographing film. The display section has a memory circuit which is operated temporarily by a data entering signal, and the time counter has a monitor display comprising a memory circuit which is operated temporarily.

6 Claims, 3 Drawing Figures

DATA ENTERING CAMERA

BACKGROUND OF THE INVENTION

This invention relates to a data entering camera and more particularly to a camera capable of entering values indicated by a stop watch in the photographs to be taken by the camera.

Conventionally, a variety of cameras capable of entering photographed date on each photograph to be taken have been proposed and used in practice. In a certain camera of such type, there is incorporated a date display device of a digital watch as a data setting device, and the data displayed by the data display device is entered in part of the photographing surface of a film when photographing, so that the date is automatically recorded in the photographing surface without any data setting operation whenever photographs are taken.

In any types of the conventional cameras of this type, only the photographing date is entered in the photographing surface of film. Therefore, the conventional data incorporating cameras are of no use, for example, when it is desired to record the condition of a racer at the time of his lap and his lap time simultaneously in field and track events, or when it is desired to record simultaneously a knock-out scene and the required time for it in boxing match.

SUMMARY OF THE INVENTION

It is therefore an object of the invention to provide a camera in which a stop watch is started interlockingly with the operation of a shutter of the camera so that the data displayed by the stop watch is entered in the photographed surfaces of a film, whereby a lap time and the image at the lap time are recorded in the same photographed surface.

A feature of the invention is that a camera according to the invention is provided with a time counter which starts its operation simultaneously with the operation of the shutter, and a data display section for displaying the value indicated by the time counter and entering the displayed value in the photographing surface of each film.

According to the invention, since the stop watch starts its operation interlockingly with the operation of the shutter and the data indicated by the stop watch is entered in the image of a photographing object, the camera of the invention is useful in recording various matches and other events.

Furthermore, if the invention is applied to a motor drive camera or to a camera with an auto winder, the movement of an object and its lapse of time can be photographed in series within a short time, such cameras can be used more effectively for recording.

DESCRIPTION OF THE PREFERRED EMBODIMENTS

Figure 1:
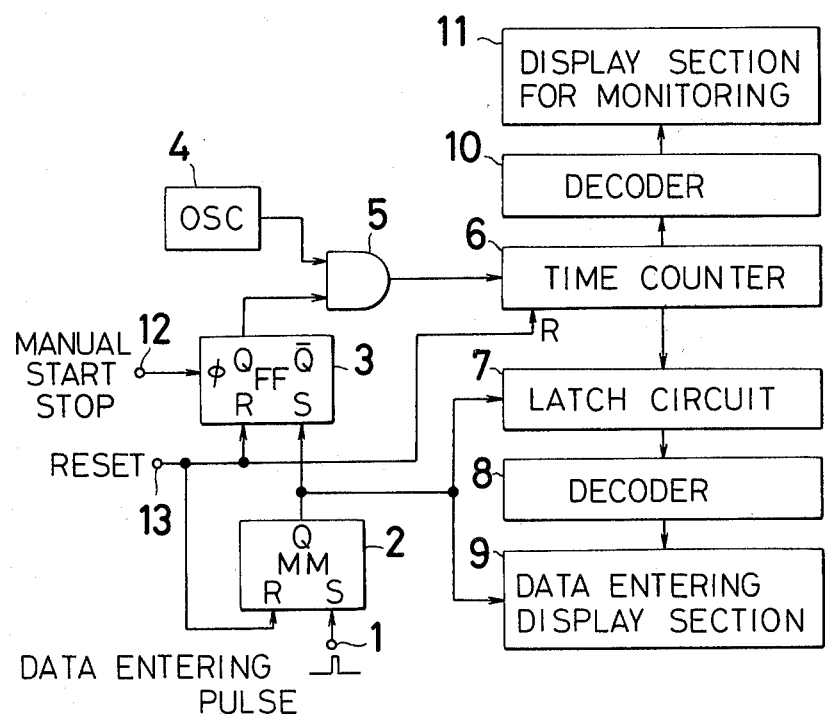
FIG. 1 is a block diagram of an embodiment of a data entering camera according to the invention.

Referring to FIG. 1, there is shown a block diagram of an embodiment of a data entering camera of the invention. In FIG. 1, reference numeral 1 represents an input terminal for data entering pulse signal which is generated by operating the shutter of a camera. This input terminal 1 is connected to a set signal input terminal of a monostable multi-vibrator 2. The data entering pulse signal can be taken out, for example, through a synchro-contact for synchronous light emission for photographing. The output signal of the multi-vibrator 2 is applied to a flip-flop circuit 3 as a set signal thereof and also applied to a latch circuit 7 and a data display section 9 as their respective operation signal. An output terminal Q of the flip-flop circuit 3 is connected to an input terminal of an AND circuit 5, and to another input terminal of the AND circuit 5, there is applied a clock pulse from a clock pulse oscillator 4. An output terminal of the AND circuit 5 is connected to an input terminal of a time counter 6. An input terminal $\phi$ of the flip-flop circuit 3 is connected to a manual start/stop signal input terminal 12. The input terminal 12 is connected to a depression button (not shown) for manual operation, and whenever the button is depressed, a pulse signal is applied to the flip-flop circuit 3.

An output signal of the time counter 6 is connected to an input terminal of the latch circuit 7, and by the operation signal from the multi-vibrator 2, the latch circuit 7 is operated and a time signal of the time counter 6 is temporarily stored in the latch circuit 7. The stored signal is applied to a decoder 8 and is converted to a signal necessary for digital display. The output signal of the decoder 8 is applied to the data entering display section 9, so that the time counted by the time counter 6 is displayed digitally. The data entering display section 9 is composed of, for example, digital display elements with appropriate number of digits, employing light emitting diodes, so that the displayed data is entered in the photosensitive film surface spread across a photographing window.

Another output signal of the time counter 6 is applied to another decoder 10 and is converted to a signal necessary for its digital display and is then applied to a monitor display section 11, whereby the output signal is displayed digitally.

A reset signal is applied through a terminal 13 to each of the reset signal input terminals of the multivibrator 2, the flip-flop circuit 3 and the time counter 6. To the terminal 13 is applied a signal, for example, by depressing a button (not shown).

Figure 2:
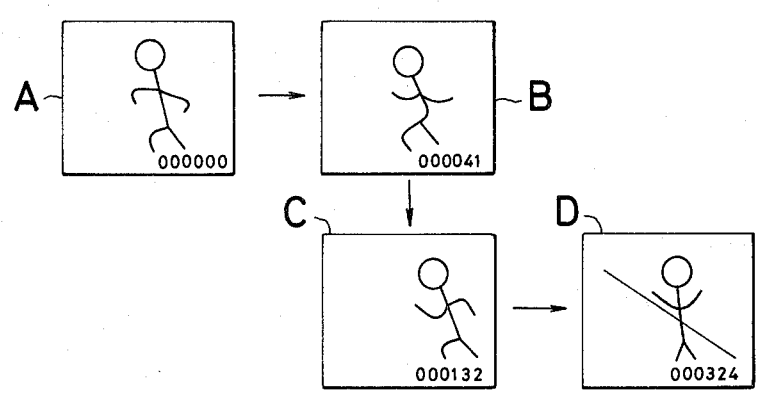
FIG. 2 illustrates some examples of the data entered images.

The action of the above embodiment of a data entering camera according to the invention will now be explained by referring to FIG. 2. If the object is a runner in a field and track event and the scenes at predetermined respectively distances covered by the runner, the respective lap times thereof, the scene at his goal and the time required are entered in the respective photographing surfaces of films, the shutter button is depressed and the runner is photographed simultaneously with his start. With the operation of the shutter, the data entering pulse is applied to a set signal input terminal of the multivibrator 2 through the terminal 1, and the multivibrator 2 produces a pulse signal with a predetermined duration. This signal is applied to the latch circuit 7 and the display section 9 as the operation signal therefor, so that the latch circuit 7 and the display section 9 are energized and, at the same time, the signal is applied to the flip-flop circuit 3 as its set signal, so that the flip-flop circuit 3 is inversed, whereby the terminal Q of the flip-flop circuit 3 produces a signal and opens a gate of the AND circuit 5 and a clock pulse from the clock pulse oscillator 4 is applied the time counter 6 through the AND circuit. The counter 6 begins to count the clock pulse. However, since the latch circuit 7 temporarily performs the memory operation by the operation signal at the start of the runner, namely when the value counted by the counter 6 is zero, the display section 9 displays, for example, "000000", during the temporary memory operation. This display is entered in part of a film image surface A as shown in FIG. 2. As mentioned previously, on the image surface A, the start scene of the object runner is simultaneously photographed by operating the shutter. The display time of the data in the display section 9 is equal to the duration for the multivibrator 2 to produce the signal. Therefore, the time constant of the multivibrator 2 is set so as to give a sufficient time for the display of the display section 9 to be entered in the film.

On the other hand, the counted value of the counter 6 is applied to the monitor display section 11 through the decoder 10, and the display section 11 displays the lapse of time moment by moment.

When the runner at a position of a predetermined lap is photographed in the film image surface B in FIG. 2, the multivibrator 2 is energized by the data energizing pulse signal from the shutter, so that a pulse signal with a predetermined duration is produced in the same manner as before. The output signal is applied to the set signal input terminal of the flip-flop circuit 3. However, since the flip-flop circuit 3 has already been inversed by the signal from the multivibrator 2, the flip-flop circuit 3 is not inversed again by this signal from the vibrator 2. Therefore, the AND circuit 5 continuously allows the clock pulse from the oscillator 4 to pass therethrough, and the time counter 6 is continuously performing the countering from the previous shutter operation on. On the other hand, the output of the multivibrator 2 is applied to the latch circuit 7 and the display section 9, so that the latch circuit 7 and the display section 9 are energized and the latch circuit 7 temporarily stores the counted value of the counter 6 at that time, and at the same time, the counted value is displayed digitally by the display section 9. The displayed value is entered in the film image surface B, together with the runner at the time of his lap.

At the time of the second lap and when the runner reaches his goal, the same operation is performed as mentioned above, whereby the runner at his second lap and his lap time are entered in the film image surface C, and the runner at his goal and the required time are entered in the film surface D, respectively.

Since the counter 6 continuously counts time after the runner's reaching his goal, if it is desired to stop the counting, the reset switch is manually operated, so that a reset signal is applied from the terminal 13 to the multivibrator 2, the flip-flop circuit 3 and the counter 6. By the reset signal, the output of the multivibrator 2 is stopped, the flip-flop circuit 3 is inversed, and the output from the terminal Q is stopped. Therefore, the AND gates 5 closes its gate and prohibits passage of the clock pulse therethrough, and the counter 6 resets its counted value at zero. When the shutter is operated again under this condition, the value displayed by the stop watch is entered in the same film image surface as that of an object in the same manner as mentioned above.

The embodiment in FIG. 1 can be used as a simple stop watch by operating a manual switch, irrespectively of the photographing of the object. To be more specific, the switch is depressed simultaneously with the start of a runner, so that one pulse signal is applied from the terminal 12 to the terminal $\phi$ of the flip-flop circuit 3. By this signal, the flip-flop circuit 3 is inversed and produces a signal from the terminal Q and opens the gate of the AND circuit 5 to apply a clock pulse to the counter 6. In the same manner as mentioned before, the counter 6 counts the clock pulse moment by moment and displays the value at the display section 11 through the decoder 10.

Simultaneously with the runner's reaching his goal, the switch is depressed again, whereby one pulse signal is applied to the terminal $\phi$ of the flip-flop circuit, the flip-flop circuit 3 is inversed again, the signal from the terminal Q is stopped, the AND circuit 5 prohibits passage of the clock pulse therethrough, and the counted value of the counter 6 is fixed. Since the display section 11 also remains to display the counted value of the counter 6, the required time for the runner to run can be known from the displayed value of the display section 11. So long as the embodiment according to the invention in FIG. 1 is utilized as a single stop watch, a data entering pulse is not applied to the terminal 1, and neither the latch circuit 7 nor the display section 9 is operated. Therefore, no data is entered in the film image surface. However, when it is desired that a runner at the time of his lap and his required time or the runner when reaching his goal and his required time be recorded after starting the stop watch by the manual operation of the depression switch, it can be performed by operating the shutter in the same manner as mentioned above. To be more specific, the latch circuit 7 and the display section 9 are energized by the data entering pulse, and the counted value of the counter 6 is entered in the film. After using this embodiment as a single stop watch, a reset signal is applied from the terminal 12 to the multivibrator 2, the flip-flop circuit 3 and the counter 6 by resetting the reset button, whereby the multivibrator 2, flip-flop circuit 3 and counter 6 can be reset.

In the so-far explained embodiment of the invention, the monitor display section 11 is provided. Therefore, the lapse of time can be monitored irrespectively of photographing.

However, since the display section 11 changes its displaying value moment by moment, it is difficult to know what lap time has been entered in the film image surface at the time of lap the runner.

Figure 3:
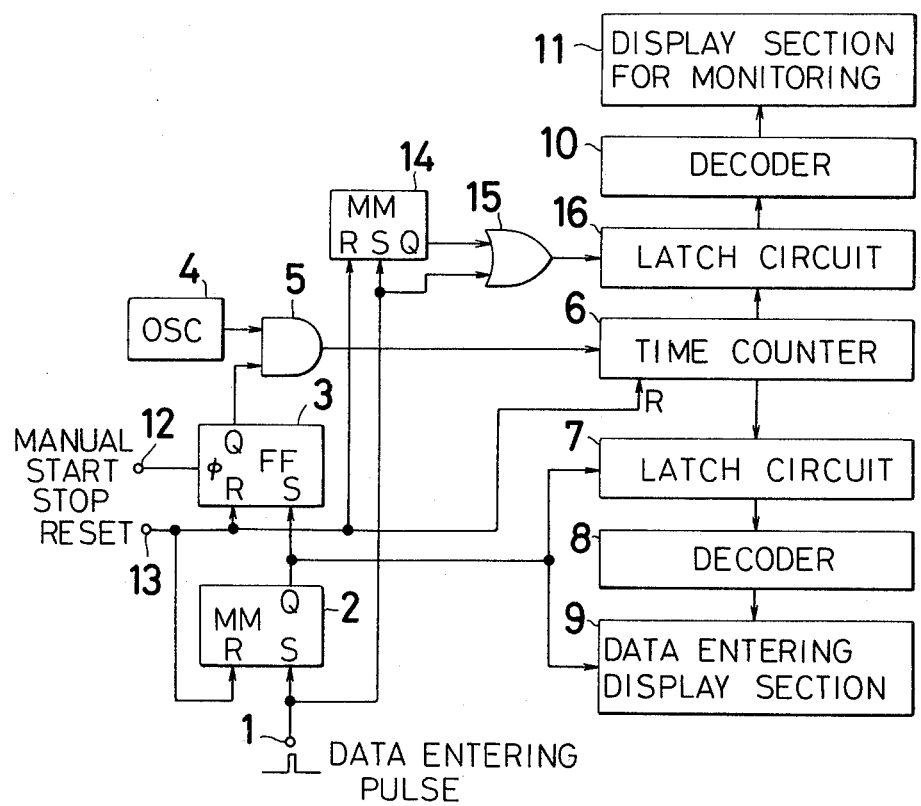
FIG. 3 is a block diagram of another embodiment of the invention.

Referring to FIG. 3, there is shown another embodiment of a data entering camera according to the invention, which eliminates the above-mentioned shortcoming in the first embodiment of the invention and which enables the operator to confirm the lap time entered in the film on the spot. Since most parts of the embodiment in FIG. 3 are the same as those of the embodiment in FIG. 1, the identical reference numerals are given to those common parts in FIG. 3, and only the diferrent parts will be explained.

In FIG. 3, the data entering pulse signal from the terminal 1 is applied to a set signal input terminal of a second monostable multivibrator 14 and, at the same time, is applied to one input terminal of an OR circuit 15. A reset signal input terminal of the multivibrator 14 is connected to the terminal 13, and an output terminal of the multivibrator 14 is connected to the other input terminal of the OR circuit 15. Between the time counter 6 and the decoder 10, there is inserted a latch circuit 16, which temporarily stores the counted value of the counter 6. The latch circuit 16 is operated by the output signal of the OR circuit 15. The time constant of the multivibrator 14 is set approximately in the range of 3 to 5 seconds.

Even in this embodiment, the photographing of object and entering of time elasping data in the film image surface and the single use of a stop watch are exactly the same in the functions as those of the embodiment in FIG. 1. As explained in the preceding embodiment, when a runner is photographed simultaneously with his start and the time counting is started by the counter 6 and the runner is again photographed at the the time of his lap, the data entering pulse signal is applied to the latch circuit 16 through a set signal input terminal of the multivibrator 14, and the multivibrator 14 produces a pulse signal with a predetermined duration. The output signal of the multivibrator 14 is applied to the latch circuit 16 through the OR circuit 15. While these signals are being applied to the latch circuit 16, namely for the period of 3 to 5 seconds which is determined by the time constant of the multivibrator 14, the latch circuit 16 stores the value of time counting of the counter 6. The stored signal is displayed digitally by the monitor display section 11 through the decoder 10. Since the display section 11 displays the lap time for 3 to 5 seconds, the lap time can be easily read. In this embodiment, data (year, month and day) and time (hour, minute and second) can be entered in the photographing film by switching the stop watch to the use of the module of a commercially available digital watch with multifunctions as a data setting apparatus.

What is claimed is:

1. A camera which enters stop watch data on a photographing film, comprising a camera body, film positioning means for positioning an undeveloped photographic film within said camera body, film exposure means including a shutter for exposure of said film under operator control, a stop watch time counter within said camera body and having a display means positioned within the camera body so that the stop watch time may be recorded on said film, start means to start the timing of the stop watch, intermediate lap means which is automatically responsive to operation of the shutter and which exposes the film to the display means synchronous with the shutter operation and without stopping the stop watch timing; manual reset stop means to stop the timing of the stop watch under operator control and unsynchronous with shutter operation; and means to synchronize the operation of the said shutter with the said start means so that the film is exposed synchronously with the shutter operation at the start of the stop watch timing and during its timing.

2. A camera as in claim 1, wherein said display means comprises a memory circuit which is operated temporarily by a data entering signal.

3. A camera as in claim 1, wherein said time counter includes a monitor display section viewable by the camera operator.

4. A camera as in claim 3, wherein said monitor display section comprises a memory circuit which is operated temporarily.

5. A camera as in claim 1, wherein the stop watch time counter is a solid-state electronic digital device and means to synchronize is a data entering pulse produced by operation of the shutter.

6. A camera as in claim 1, wherein said intermediate lap means includes a latch circuit connected between the stop watch and the display to temporarily store the time at the intermediate shutter operation.

* * * * *